Sept. 9, 1947.  E. R. BACKUS  2,427,248
UNCOILER
Filed March 31, 1945  2 Sheets-Sheet 1

INVENTOR
EARL R. BACKUS,
by
John F. Jackson
his Attorney.

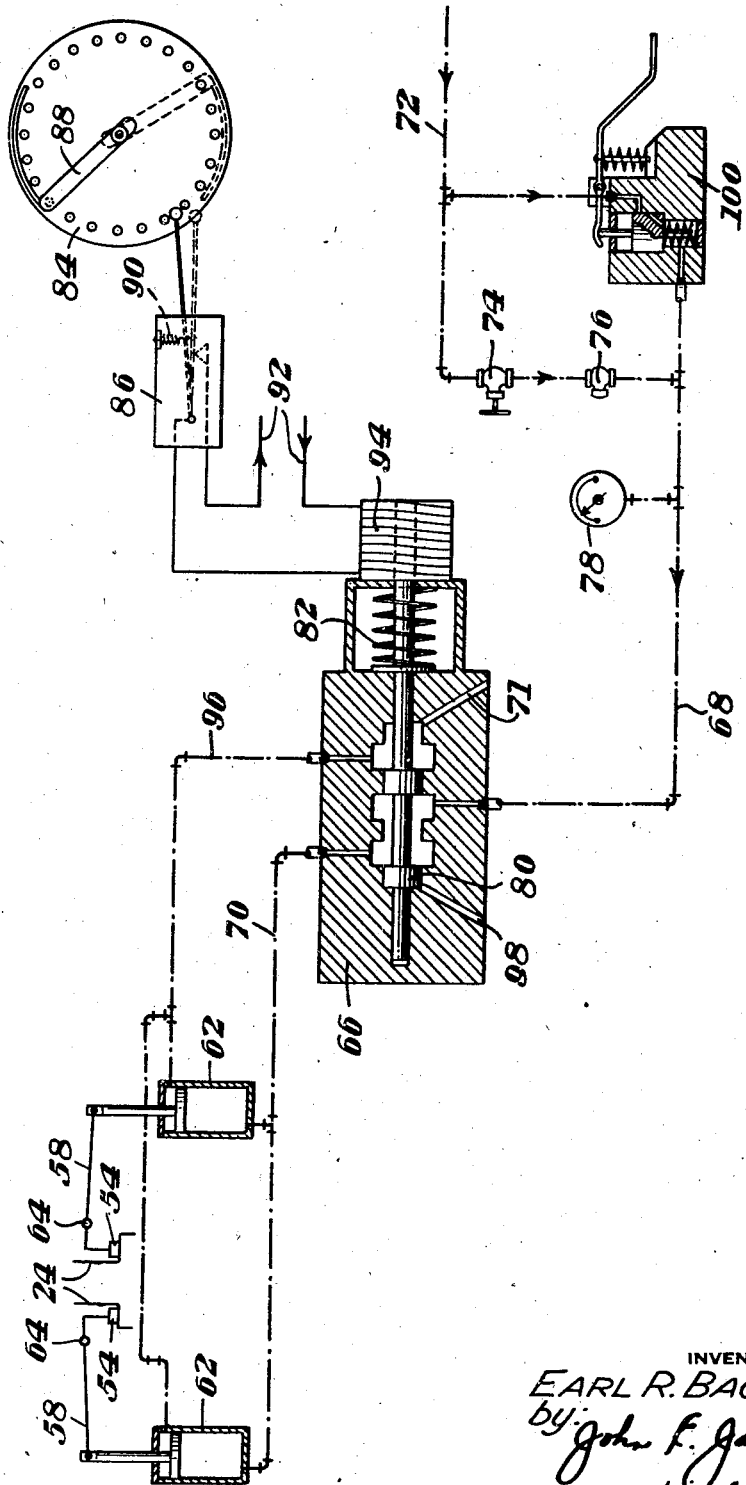

Patented Sept. 9, 1947

2,427,248

UNITED STATES PATENT OFFICE 2,427,248

UNCOILER

Earl R. Backus, Glassport, Pa., assignor to Carnegie-Illinois Steel Corporation, a corporation of New Jersey Application March 31, 1945, Serial No. 585,877

4 Claims. (Cl. 242—78)

This invention relates to uncoilers and more particularly to such uncoilers used on strip processing equipment such as electrocleaning, electroplating, and rolling, wherein the strip is drawn from the coil while it is held between two cone shaped mandrels.

The uncoilers now in use have two opposed coil engaging heads mounted for movement toward and away from each other with each of the heads having a cone mounted on a shaft extending through and supported by anti-friction bearings in the housing. In this construction the shaft must be rather light in order to avoid excessively large bearings and since the shaft is subjected to heavy overhung loading due to the distance from the bearing to the coil, frequent shaft and bearing failures occur. The shaft is also subjected to eccentric loading with resultant impact due to the cones on the coils crushing the inner wraps of the coil and therefore not holding the coil centrally. In most cases it is necessary to apply back tension to the strip and this is most readily obtained by hand actuated friction brakes applied to the uncoiler shafts or in more elaborate installations requiring greater and more accurate amounts of back tension, an electric generator or a pump may be connected to the revolving parts of the uncoiler. Friction brakes do not prove satisfactory at high speeds and constant operation because of the heat developed in the brake and the necessity of frequent adjustment and replacement of the braking surface. Uncoilers using generators in their operation require expensive electrical equipment for proper control, and only on special types of processing equipment is such an installation justified. It is known to use a combination of generators and friction brakes such as disclosed in the patent to Iversen et al. No. 2,236,971, but this also is expensive. Since the operator determines whether he should use the friction brake, the generator, or both, the control of back tension is not accurate. I have found that by using two conventional rotary positive displacement pumps, one driven by each of the revolving cones, good control of the back tension is obtained at high speeds such as 800 to 1000 feet per minute. However, at speeds below 600 feet per minute the pumps do not consume sufficient power to maintain the necessary tension in the strip and an air operated friction brake is therefore used to provide additional retarding effects at the lower speeds.

It is therefore an object of my invention to provide an uncoiler in which back tension is applied to the strip at high speeds by means of a rotary pump and additional back tension is applied at low speeds by means of a friction brake controlled by the speed of the strip.

Another object is to provide means for mounting the uncoiler cones on bearings so that the load is not applied eccentric thereto.

These and other objects will be more apparent after referring to the following specification and attached drawings, in which:

Figure 3 is a schematic diagram of the automatic air braking arrangement.

Figure 1:
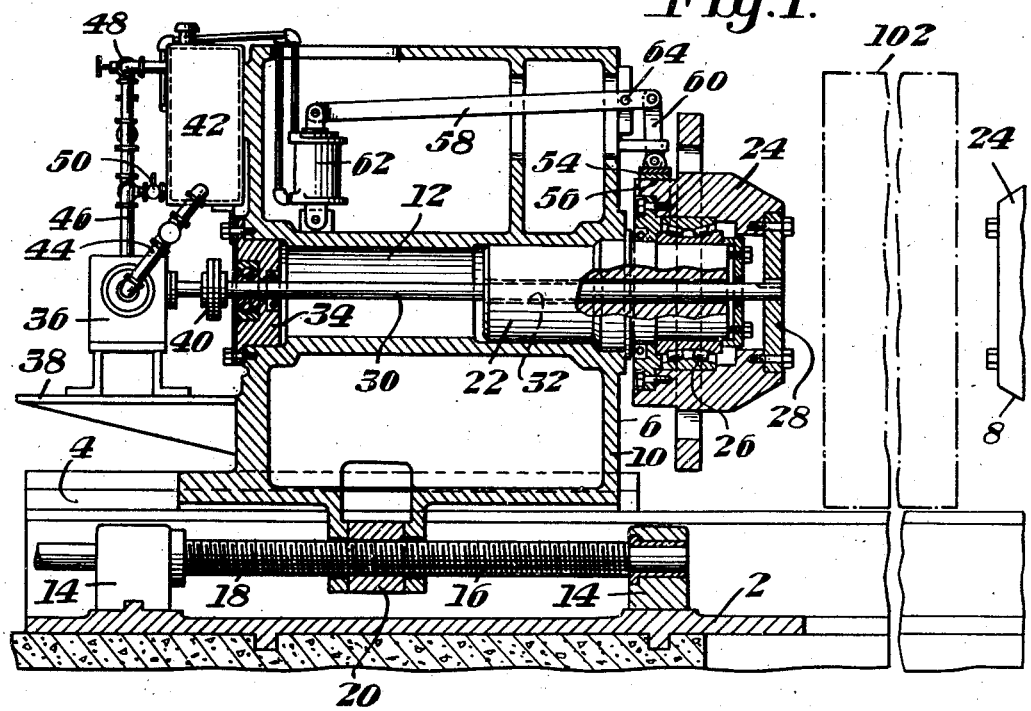
Figure 1 is a side elevation, partly in section, illustrating in detail one-half of the apparatus, the remainder being identical and deleted in the interests of brevity.
Figure 2:
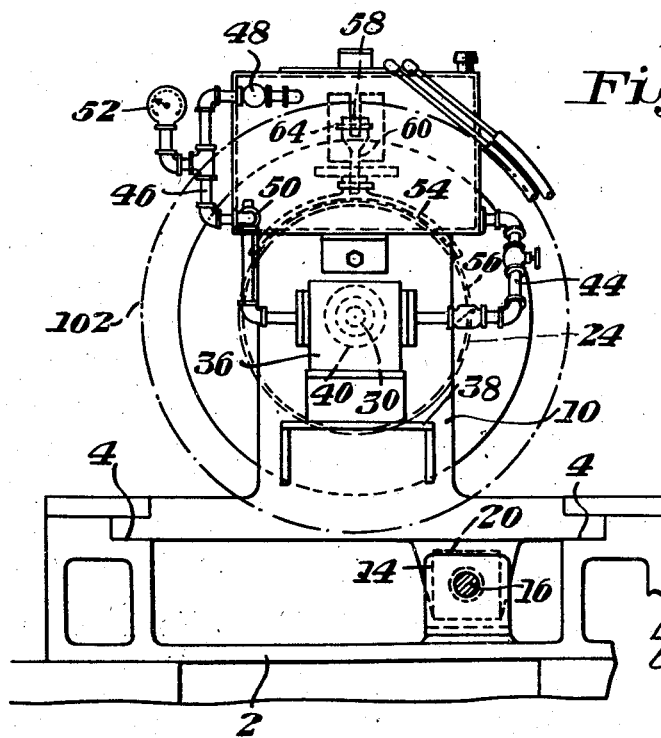
Figure 2 is an end view of Figure 1.

Referring more particularly to the drawings, the reference numeral 2 designates a bed having a pair of opposed ways 4 on which are mounted a pair of opposed coil-engaging heads 6 and 8, either, or both, of which are adapted for reciprocal movement in order to receive between them the coil to be unwound. Each of the heads 6 and 8 is provided with a housing 10 having an opening 12 therethrough. On each side of the transverse center line of the bed 2 between the opposed ways 4 there is a pair of aligned bearings 14, each pair of which is disposed beneath one of the coil-engaging heads 6 or 8. In each pair of bearings 14, there is journaled a shaft 16 having an intermediate screw thread portion 18. Secured to the bottom of each of the heads 6 and 8 is a nut 20 which depends downwardly between the opposed ways 4 and carries a nut element which is engaged by the screw thread portion 18 of the shaft 16. Mounted in the opening 12 of each head is a heavy fixed pin 22 for supporting the cone 24 on a double row tapered roller bearing 26. A drive plate 28 is bolted to the cone 24 and keyed to one end of a shaft 30 which extends through an opening 32 in pin 22, the other end of the shaft being mounted in bearings 34 bolted to the housing 10.

A positive displacement rotary pump 36 is carried on bracket 38 which is attached to the housing 10 and is driven by the shaft 30 through a coupling 40. A small circulating tank 42 provides a reservoir of oil which flows to the pump 36 through pipe connections 44. The oil is forced from the pump through outlet 46 and an adjustable pressure relief valve 48 in the outlet line determines the pressure against which the oil is to be pumped. A branch connection is also provided through which the oil may return to the tank 42 through a relief valve 50 in case the valve 48 does not pass sufficient oil at high speed. The pressure at which the valve 50 opens is the maximum allowable for the pump and is not adjustable. A gage 52 is used in the outlet line to determine the pressure delivered by the pump at the various settings of the relief valve 48.

A brake shoe 54, adapted to bear against the braking surface 56 of the cone 24, is connected to a lever arm 58 by means of a link 60. An air cylinder 62 is mounted on the housing 10 for actuating the lever 58 which is pivoted about a fulcrum pin 64.

Figure 3 shows the two air cylinders 62 which move the brake shoes 54 into frictional engagement with the cones. Air is admitted to the cylinders through a solenoid operated control valve 66 which is shown in position for admitting air from line 68 through line 70 to the lower part of the cylinders 62 and exhausting the air from exhaust port 71. This forces the brake shoes 54 into contact with the cones 24. Air pressure to line 68 is received from an air supply line 72 through an air pressure regulating valve 74, which reduces the line pressure to that necessary for proper operation, and through a check valve 76 which permits flow of air in the direction shown by arrows. A pressure gage 78 is provided in line 68 to indicate the pressure obtained from the regulating valve 74. The plunger 80 of the valve 66 is held in the position shown by a spring 82. The position of plunger 80 is controlled from the line speed control rheostat 84, which may be motor operated as shown or hand controlled. In either case, it is equipped with a limit switch 86, which is located and connected so that at a predetermined position, it is closed by movement of rheostat arm 88. A spring 90 normally holds the limit switch 86 in open position. Closing of switch 86 completes the circuit from power supply lines 92 to solenoid coil 94. This moves plunger 80 to the right against the pressure of spring 82 to permit air to flow from line 68 to line 96 and to exhaust the air from line 70 through exhaust port 98. A foot valve 100 is located in a position convenient to the operator and is used to by-pass the regulator valve 74 and to admit full line pressure to the cylinders 62 for maximum braking effect in case of emergency or when the line is rapidly decelerated.

The operation of the device is as follows:

The coil 102 is placed in the position shown in broken lines in Figure 1 and the shafts 16 are rotated to move the heads 6 and 8 toward the center until the cones 24 enter the bore of the coil to support it firmly. At low speeds the limit switch 86 is open and air will be entering the bottom of cylinders 62 to apply the brakes 54. As the arm 88 is moved from the neutral position shown in dotted lines in Figure 3, the speed increases and at the desired speed the arm 88 will automatically close limit switch 86 to energize coil 94 and move the plunger 80 to the right to admit air to the top of cylinders 62, thus releasing brakes 54. At all times cones 24 will be driving pumps 36 through shaft 30 to apply back tension to the strip. When the speed of the strip decreases, the limit switch 86 is opened by movement of arm 88 to apply air to the bottom of the cylinders 62 to apply the brakes 54. This supplements the back pressure applied by the pumps 36 to obtain the necessary back tension in the strip at low speeds.

While one embodiment of my invention has been shown and described, it will be apparent that other adaptations and modifications may be made without departing from the scope of the following claims.

I claim:

1. In a machine for supporting a coiled strip during an uncoiling operation, in combination, a pair of opposed coil-engaging heads mounted for movement toward each other, each of said heads including a housing, a pin mounted in said housing and extending therefrom in the direction of the coil to be supported, said pin having an axial opening therethrough, bearings mounted on the outer end of the pin, a coil-engaging means rotatably mounted on the bearings, and a shaft extending through said opening connected to be driven by said coil-engaging means.

2. In a machine for supporting a coiled strip during an uncoiling operation, in combination, a pair of opposed coil-engaging heads mounted for movement toward each other, each of said heads including a housing, a pin mounted in said housing and extending therefrom in the direction of the coil to be supported, said pin having an axial opening therethrough, bearings mounted on the outer end of the pin, a coil-engaging means rotatably mounted on the bearings, a drive plate mounted on the outer end of the coil-engaging means and a shaft extending through said opening connected to said drive plate.

3. In a machine for supporting a coiled strip during an uncoiling operation, in combination, a housing, a pin mounted in said housing and extending therefrom in the direction of the coil to be supported, said pin having an axial opening therethrough, a coil-engaging means rotatably mounted on the outer end of said pin, a shaft extending through said opening connected to be driven by said coil-engaging means, a pump driven by said shaft to apply back tension to said strip, a friction brake for said coil-engaging means, and means operable at low speeds of the strip for applying said friction brake.

4. In a machine for supporting a coiled strip during an uncoiling operation, in combination, a housing, a coil-engaging means rotatably mounted with respect to said housing, a pump driven by said coil-engaging means to apply back tension to said strip, a friction brake for said coil-engaging means, and means operable at low speeds of the strip for applying said friction brake.

EARL R. BACKUS.

REFERENCES CITED

The following references are of record in the file of this patent:

UNITED STATES PATENTS

| Number | Name | Date |
|---|---|---|
| 2,250,025 | Klein | July 22, 1941 |
| 2,061,177 | Tasker | Nov. 17, 1936 |

FOREIGN PATENTS

| Number | Country | Date |
|---|---|---|
| 447,333 | Germany | July 22, 1927 |